United States Patent
Han et al.

(10) Patent No.: US 10,860,063 B2
(45) Date of Patent: Dec. 8, 2020

(54) FLEXIBLE DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Wen Han, Hubei (CN); Zhuo Zhang, Hubei (CN); Fang Wang, Hubei (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/609,852

(22) PCT Filed: May 24, 2019

(86) PCT No.: PCT/CN2019/088311
§ 371 (c)(1),
(2) Date: Oct. 31, 2019

(87) PCT Pub. No.: WO2020/220417
PCT Pub. Date: Nov. 5, 2020

(65) Prior Publication Data
US 2020/0348726 A1    Nov. 5, 2020

(30) Foreign Application Priority Data
Apr. 30, 2019 (CN) .......................... 2019 1 0362103

(51) Int. Cl.
*G06F 1/16* (2006.01)

(52) U.S. Cl.
CPC .......... *G06F 1/1652* (2013.01); *G06F 1/1624* (2013.01)

(58) Field of Classification Search
CPC ....... G06F 1/1652; G06F 1/1624; G09F 9/301
See application file for complete search history.

(56) References Cited

U.S. PATENT DOCUMENTS

| | | | |
|---|---|---|---|
| 2018/0014417 A1* | 1/2018 | Seo | H05K 1/189 |
| 2018/0102072 A1* | 4/2018 | Lee | G06F 3/147 |
| 2018/0376603 A1* | 12/2018 | Lee | H04M 1/0268 |
| 2019/0297736 A1* | 9/2019 | Xu | H05K 1/028 |
| 2020/0020255 A1* | 1/2020 | Yoon | G06F 1/1656 |
| 2020/0103941 A1* | 4/2020 | Lin | G06F 1/1681 |

* cited by examiner

*Primary Examiner* — Anthony Q Edwards
(74) *Attorney, Agent, or Firm* — Mark M. Friedman

(57) ABSTRACT

A flexible display device is provided, which includes a housing, a sliding assembly, and a flexible assembly. The flexible assembly includes a first section and a second section, and the second section is positioned in the housing. When the flexible display device is displayed on a small screen, the first section is in a display state, and the second section is in a non-display state. When the flexible display device is displayed on a large screen, the sliding assembly moves the second section from within the housing to a surface of the sliding assembly, the first section and the second section are in the display states.

19 Claims, 4 Drawing Sheets

FLEXIBLE DISPLAY DEVICE

FIELD OF INVENTION

The present application relates to a field of display, and in particular to a flexible display device.

BACKGROUND OF INVENTION

With development of technology, appearance of mobile electronic devices has undergone tremendous changes. Among them, flexible screens have attracted much attention due to their unique characteristics and huge potential. Compared with traditional screens, flexible screens are flexible and bendable, which can reduce the degree of accidental damage to the equipment and is much more durable than other screens.

The current flexible screens include foldable and rollable display screens. Although the two types of display screens reduce the size of a panel to a certain extent, they still occupy a large space.

Therefore, a flexible display device is needed to solve the above technical problem.

SUMMARY OF INVENTION

The present application provides a flexible display device to solve the technical problem that a current flexible screen occupies a large space.

In order to solve the above problems, the technical solution provided by the present application is as follows.

The present application provides a flexible display device, including a housing, a sliding assembly positioned on the housing, and a flexible assembly positioned on the sliding assembly; wherein the flexible assembly includes a first section positioned on the sliding assembly and a second section integrally connected to the first section, and the second section is positioned in the housing; when the flexible display device is structured and configured to be in a small screen display state and a large screen display state, wherein in the small screen display state, the first section is in a display state, and the second section is in a non-display state; and in the large screen display state, the sliding assembly is movable in a direction away from the second section, causing the second section to move from within the housing to a surface of the sliding assembly, wherein the first section and the second section are in display.

In the flexible display device of the present application, the flexible assembly includes a flexible screen, a stretched layer, and a bonding layer between the flexible screen and the stretched layer.

In the flexible display device of the present application, an area of the flexible screen is less than an area of the stretched layer.

In the flexible display device of the present application, the flexible assembly further includes a third section connected to the second section, the flexible screen, the stretched layer, and the bonding layer between the flexible screen and the stretched layer are disposed in the first section and the second section, and the stretched layer is disposed in the third section.

In the flexible display device of the present application, further including an elastic assembly disposed in the housing, wherein an end of the elastic assembly is fixed in the housing, and another end of the elastic assembly is elastically connected to the stretched layer of the flexible assembly.

In the flexible display device of the present application, the elastic assembly includes a first fixing component, a second fixing component, and an elastic component, the first fixing component and the second fixing component are connected by the elastic component, and the first fixing component is fixed to the housing by welding or an adhesive, and the second fixing component is fixedly connected to the stretched layer by welding or an adhesive.

In the flexible display device of the present application, the elastic component is a spring.

In the flexible display device of the present application, the elastic assembly includes a fixed shaft, a rotating shaft, and a curling member fixed to the rotating shaft, an end of the curling member is fixedly connected to the rotating shaft, and another end of the curling member is fixedly connected to the stretched layer in the third section.

In the flexible display device of the present application, material of the curling member is the same as material of the stretched layer.

In the flexible display device of the present application, further including at least one reel disposed within the housing; wherein the flexible assembly is stretched into the housing by curling of the reel and is connected to the elastic assembly, when the flexible display device is displayed on the large screen, a driving force of the sliding assembly moves the flexible assembly in the direction away from the second section, and the sliding assembly drives the flexible assembly to roll along the reel to move the second section of the flexible assembly from within the housing to the surface of the sliding assembly, and when the flexible display device is displayed on the small screen, a tensile force of the elastic assembly causes the flexible assembly to roll along the reel, whereby the second section of the flexible assembly is received in the housing.

In the flexible display device of the present application, further including a first reel disposed within the housing, wherein the housing further includes a first side and a second side perpendicular to the flexible screen in the first section, the first side is opposite and parallel to the second side, the first side is disposed away from the second section, and the second side is disposed adjacent to the second section, and the first reel is disposed adjacent to the second side, and the flexible assembly is stretched in the housing through a first curling by the first reel and is connected to the elastic assembly.

In the flexible display device of the present application, further including a second reel, wherein the second reel opposite to the first reel and is disposed adjacent to the first side; the flexible assembly is stretched to the second reel through the first curling by the first reel, and is stretched to the elastic assembly through a second curling by the second reel; and the elastic assembly is disposed between the first reel and the second reel.

In the flexible display device of the present application, a diameter of the second reel is less than a diameter of the first reel.

In the flexible display device of the present application, further including a third reel disposed between the first reel and the second reel and closed to the first side, wherein the flexible assembly is stretched to the second reel through the first curling by the first reel, is stretched to the third reel through the second curling by the second reel, and is stretched to the elastic assembly through a third curling by the third reel, and the elastic assembly is disposed between the second reel and the third reel.

In the flexible display device of the present application, a diameter of the third reel is less than a diameter of the second reel.

In the flexible display device of the present application, the third reel is fixed on a sliding shaft, when the sliding assembly moves in the direction away from the second section, the third reel and the sliding shaft move toward the elastic assembly to move the second section from within the housing to the surface of the sliding assembly.

In the flexible display device of the present application, further including an engagement assembly, wherein the engagement assembly is arranged at an edge of the flexible display device and is disposed adjacent to the first side.

In the flexible display device of the present application, the engagement assembly includes at least one protrusion and at least one recession, and one of the protrusions corresponding to one of the recessions, the protrusions are disposed on the sliding assembly, the recessions are disposed on the housing, and the protrusions are engaged with the recessions.

In the flexible display device of the present application, a number of the protrusions is equal to a number of the recessions.

In the flexible display device of the present application, when the flexible display device is displayed on the large screen, an external driving force causes the protrusions of the sliding assembly to slide out from the recessions and the sliding assembly moves the second section from within the housing to the surface of the sliding assembly, and when the flexible display device is displayed on the small screen, the external driving force moves the protrusions of the sliding assembly toward the recessions, the protrusions are engaged with the recessions, and the sliding assembly is fixed to the housing.

In the flexible display device of the present application, further including a processor, a driving chip, and a power supply assembly disposed in the housing.

Advantageous effects: by setting a part of the flexible screen within the housing, the present application can simultaneously realize a large screen or small screen display without occupying extra space.

BRIEF DESCRIPTION OF FIGURES

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF EMBODIMENTS

Figure 1:
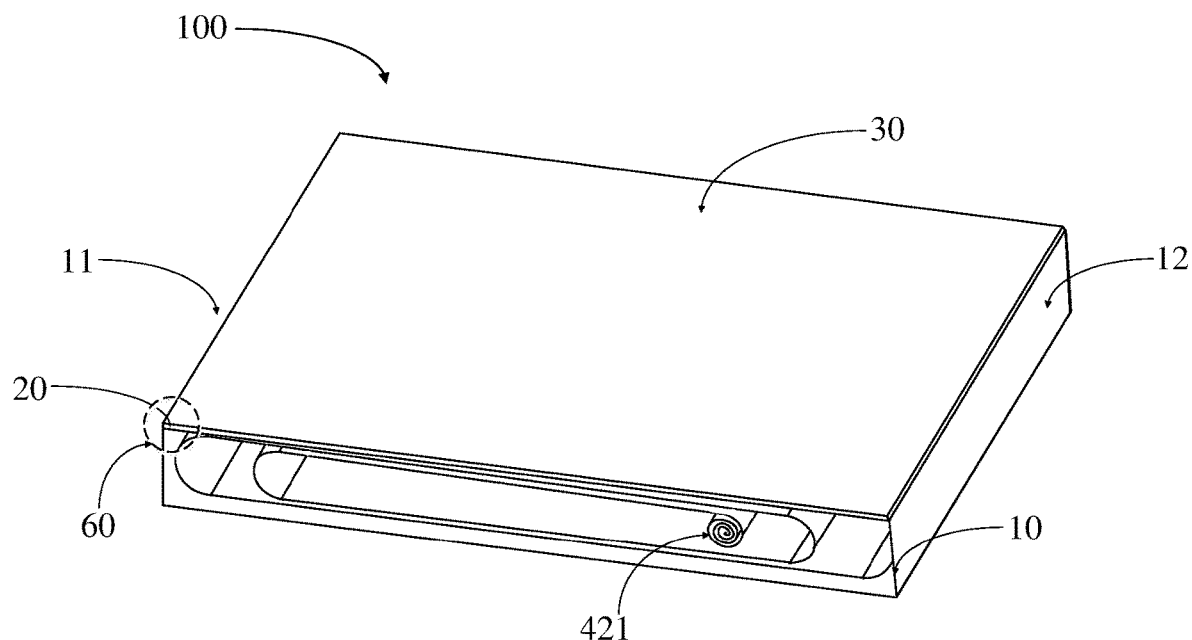
FIG. 1 is a schematic diagram showing a first structure of a flexible display device of the present application.

The following description of each embodiment, with reference to the accompanying drawings, is used to exemplify specific embodiments which can be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, components having similar structures are denoted by the same numerals.

Please refer to FIG. 1, FIG. 1 is a schematic diagram showing a first structure of a flexible display device of the present application.

The flexible display device 100 includes a housing 10, a sliding assembly 20 positioned on the housing 10, and a flexible assembly 30 positioned on the sliding assembly 20.

A portion of the flexible assembly 30 is positioned on the sliding assembly 20, and a portion of the flexible assembly 30 is received in the housing 10.

Figure 2:
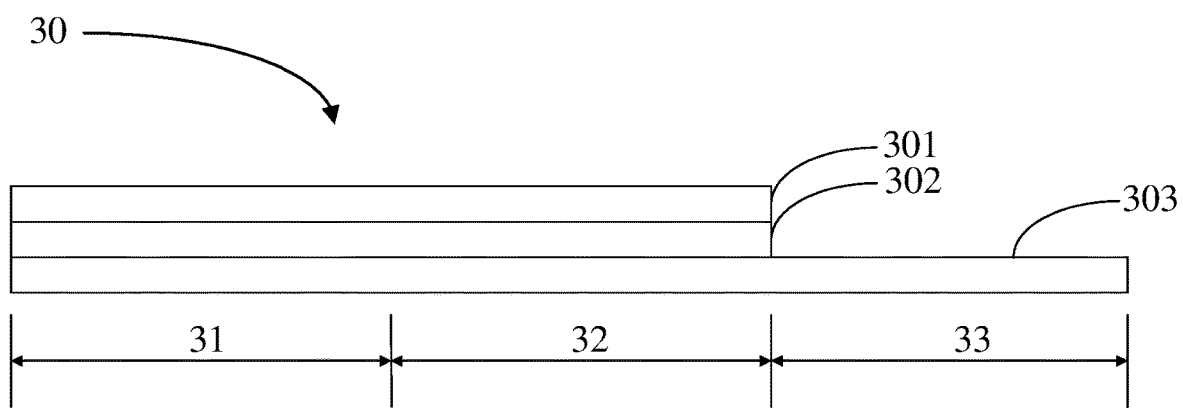
FIG. 2 is a structural diagram showing a flexible assembly of a flexible display device of the present application.

Please refer to FIG. 2, FIG. 2 is a structural diagram showing a flexible assembly of a flexible display device of the present application.

The flexible assembly 30 includes a first section 31 and a second section 32.

The first section 31 is positioned on the sliding assembly 20, and the second section 32 is positioned in the housing 10. The first section 31 is integrally connected to the second section 32.

When the flexible display device 100 is displayed on a small screen, the first section 31 is in a display state, and the second section 32 is in a non-display state.

When the flexible display device 100 is displayed on a large screen, the sliding assembly 20 moves in a direction away from the second section 32 to move the second section 32 from within the housing 10 to a surface of the sliding assembly 20, and the first section 31 and the second section 32 are in the display states.

In this embodiment, the housing 10 can be a regular cuboid.

The housing 10 includes a first side 11 and a second side 12 perpendicular to the flexible screen 301 in the first section 31, the first side is opposite and parallel to the second side, the first side is disposed away from the second section 32, and the second side is disposed adjacent to the second section 32.

Please refer to FIG. 2, the flexible assembly 30 includes a flexible screen 301, a stretched layer 303, and a bonding layer 302 between the flexible screen 301 and the stretched layer 302.

In this embodiment, the flexible screen 301 can be an LCD display or an OLED display. The flexible screen 301 can be curled into any shape.

In this embodiment, an area of the flexible screen 301 is less than an area of the stretched layer 303.

In this embodiment, the bonding layer 302 can be a sticky adhesive layer such as an optical adhesive.

In this embodiment, material of the stretched layer 303 can be a stretch-resistant SUS metal material or an amorphous material or the like.

In this embodiment, when a material of the stretched layer 303 is SUS metal material, a thickness of the stretched layer 303 can be 25 to 35 microns.

In the embodiment, the flexible screen 301, the stretched layer 303, and the bonding layer 302 between the flexible screen 301 and the stretched layer 303 are disposed in the first section 31 and the second section 32.

The flexible assembly 30 further includes a third section 33.

The third section 33 is integrally connected to the second section 32 and away from the first section 31.

The stretched layer 303 is disposed in the third section 33.

The second section 32 and the third section 33 are positioned within the housing 10.

Please refer to FIG. 1, the flexible display device 100 further includes an elastic assembly 40 disposed in the housing 10. An end of the elastic assembly 40 is fixed in the housing 10, and another end of the elastic assembly 40 is elastically connected to the stretched layer 303 of the flexible assembly 30.

Figure 3:
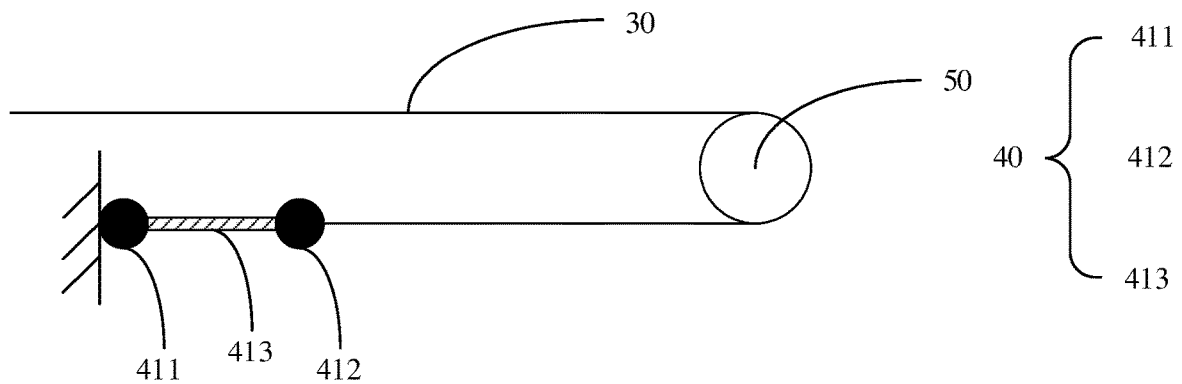
FIG. 3 is a structural diagram showing an elastic assembly of a flexible display device of the present application.

Please refer to FIG. 3, FIG. 3 is a structural diagram showing an elastic assembly of a flexible display device of the present application.

The elastic assembly 40 includes a first fixing component 411, a second fixing component 412, and an elastic component 413, the first fixing component 411 and the second fixing component 412 are connected by the elastic component 413.

In this embodiment, the first fixing component 411 is fixed to the housing 10 by welding or an adhesive, and the second fixing component 412 is fixedly connected to the stretched layer 303 by welding or an adhesive.

In this embodiment, the elastic component 413 can be a spring.

When the flexible display device 100 is displayed on a large screen, a driving force of the sliding assembly 20 moves the flexible assembly 30 in a direction away from the second section 32, the elastic component is elongated and extends toward the third section to move the second section 32 of the flexible assembly 30 from within the housing 10 to a surface of the sliding assembly 20, so that the first section 31 and the second section 32 are in the display states.

When the flexible display device 100 is displayed on a small screen, a tensile force of the elastic component causes the flexible assembly 30 moving toward the elastic assembly 40, and the second section 32 of the flexible assembly 30 is received in the housing 10.

Please refer to FIG. 1, the elastic assembly 40 includes a fixed shaft, a rotating shaft, and a curling member 421 fixed to the rotating shaft, an end of the curling member 421 is fixedly connected to the rotating shaft, and another end of the curling member 421 is fixedly connected to the stretched layer 303 in the third section 33.

In this embodiment, the elastic assembly 40 can be a coil spring.

When the flexible display device 100 is displayed on a large screen, a driving force of the sliding assembly 20 moves the flexible assembly 30 in a direction away from the second section 32, the curling member 421 of the elastic assembly rotates with the rotating shaft and extends toward the third section to move the second section 32 of the flexible assembly 30 from within the housing 10 to a surface of the sliding assembly 20, so that the first section 31 and the second section 32 are in the display states.

When the flexible display device 100 is displayed on a small screen, a tensile force of the curling member 421 causes the flexible assembly 30 moving toward the elastic assembly 40, and the second section 32 of the flexible assembly 30 is received in the housing 10.

In this embodiment, material of the curling member 421 is the same as material of the stretched layer 303. That is, the stretched layer 303 is extended to the rotating shaft and fixed on the rotating shaft.

The flexible display device 100 further includes at least one reel 50.

The reel 50 is disposed within the housing 10.

The flexible assembly 30 is stretched into the housing 10 by curling of the reel 50 and is connected to the elastic assembly 40.

when the flexible display device 100 is displayed on the large screen, a driving force of the sliding assembly 20 moves the flexible assembly 30 in the direction away from the second section 32, the sliding assembly 20 drives the flexible assembly 30 to roll along the reel 50 and the elastic assembly 40 is stretched, and the second section 32 of the flexible assembly 30 is moved from within the housing to the surface of the sliding assembly, so that the first section 31 and the second section 32 are in the display states.

When the flexible display device 100 is displayed on a small screen, the tensile force of the elastic assembly 40 causes the flexible assembly 30 to roll along the reel 50, whereby the second section 32 of the flexible assembly 30 is received in the housing 10.

Please refer to FIG. 1, the flexible display device 100 includes a first reel 51 disposed within the housing 10. The first reel 51 is disposed adjacent to a second side of the housing 10.

The flexible assembly 30 is stretched in the housing 10 through a first curling by the first reel 51 and is connected to the elastic assembly 40.

Figure 4:
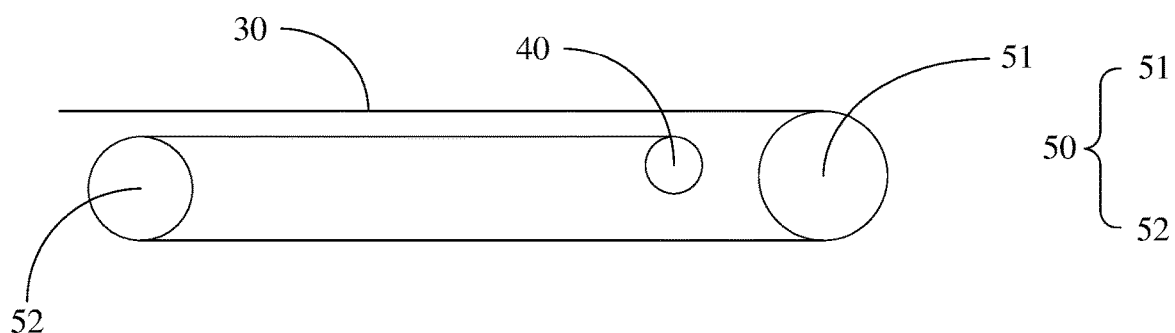
FIG. 4 is a schematic diagram showing a second structure of a flexible display device of the present application.

Please refer to FIG. 4, FIG. 4 is a schematic diagram showing a second structure of a flexible display device of the present application.

The flexible display device 100 further includes a second reel 52, the second reel 52 opposite to the first reel 51 and is disposed adjacent to the first side.

The flexible assembly 30 is stretched to the second reel 52 through a first curling by a first reel 51, and is stretched to an elastic assembly 40 through a second curling by the second reel 52, and is connected to the elastic assembly 40.

In the embodiment, the elastic assembly 40 is disposed between the first reel 51 and the second reel 52.

In this embodiment, a diameter of the second reel 52 is less than a diameter of the first reel 51.

Figure 5:
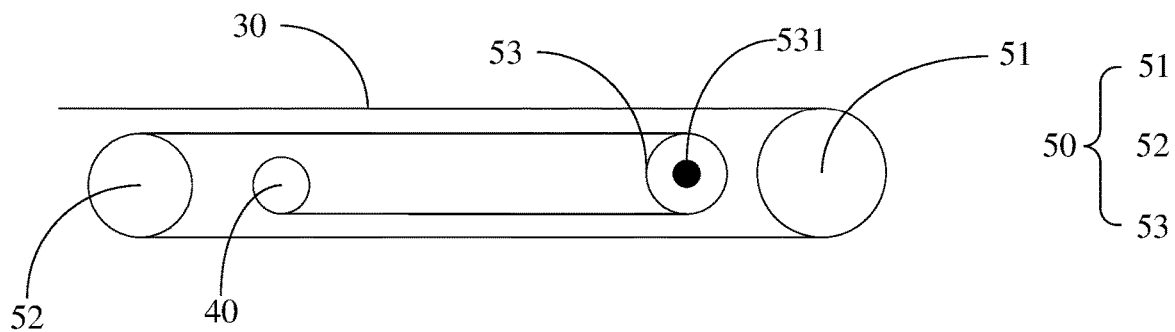
FIG. 5 is a schematic diagram showing a third structure of a flexible display device of the present application.

Please refer to FIG. 5, FIG. 5 is a schematic diagram showing a third structure of a flexible display device of the present application.

The flexible display device 100 further includes a third reel 53.

The third reel 53 is disposed between the first reel 51 and the second reel 52 and is disposed adjacent to the first reel 51.

The flexible assembly 30 is stretched to a second reel 52 through a first curling by a first reel 51, is stretched to a third reel 53 through a second curling by the second reel 52, and is stretched to an elastic assembly 40 through a third curling by the third reel 53, and is connected to the elastic assembly 40.

In the embodiment, the elastic assembly 40 is disposed between the second reel 52 and the third reel 53.

In this embodiment, a diameter of the third reel 53 is less than a diameter of the second reel 52.

The flexible display device 100 further includes a first sliding shaft 531 for fixing the third reel 53.

When the flexible display device 100 is displayed on a large screen, a driving force of the sliding assembly 20 causes the flexible assembly 30 to move away from the second section 32, and the third reel 53 is subjected to a force applied by the flexible assembly 30 toward the elastic assembly 40. In order to reduce a force of a contact area of the flexible assembly 30 and the third reel 53, the first sliding shaft 531 and the third reel 53 move toward the elastic assembly 40 to reduce the force between the third reel 53 and the flexible assembly 30. The flexible assembly 30 rolls along the reel 50 and causes the elastic assembly 40 to be stretched, and the second section 32 of the flexible assembly 30 is moved from within the housing 10 to the surface of the sliding assembly 20, so that the first section 31 and the second section 32 are in the display states.

When the flexible display device 100 is displayed on a small screen, a tensile force of the elastic assembly 40 causes the flexible assembly 30 to roll along the reel 50, and the first sliding shaft 531 moves away from the elastic assembly 40, whereby the second section 32 of the flexible assembly 30 is received in the housing 10.

Figure 6:
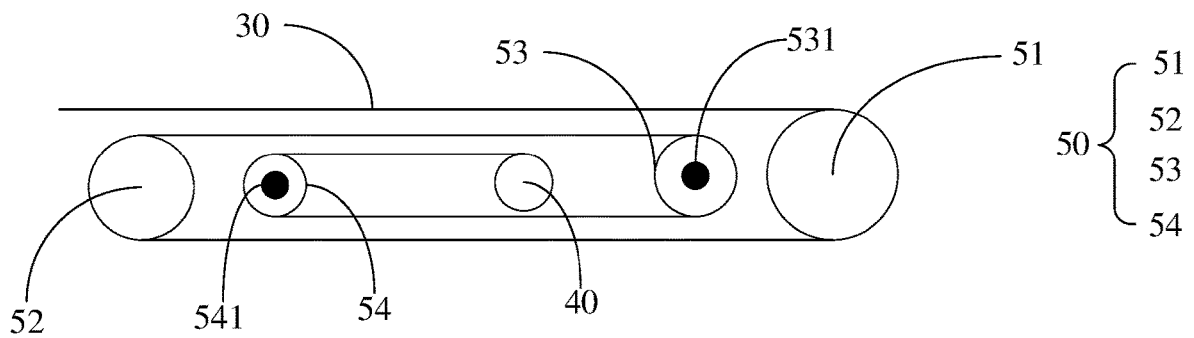
FIG. 6 is a schematic diagram showing a fourth structure of a flexible display device of the present application.

Please refer to FIG. 6, FIG. 6 is a schematic diagram showing a fourth structure of a flexible display device of the present application.

The flexible display device 100 further includes a fourth reel 54.

The fourth reel 54 is disposed between the second reel 52 and the third reel 53 and is disposed adjacent to the second reel 52.

The flexible assembly 30 is stretched to a second reel 52 through a first curling by a first reel 51, is stretched to a third reel 53 through a second curling by the second reel 52, and is stretched to an elastic assembly 40 through a third curling by the third reel 53, and is stretched to the elastic assembly 40 through a fourth curling by the fourth reel 54, and is connected to the elastic assembly 40.

In this embodiment, the elastic assembly 40 is disposed between the third reel 53 and the fourth reel 54.

In this embodiment, a diameter of the fourth reel 54 is less than a diameter of the third reel 53.

The flexible display device 100 further includes a second sliding shaft 541 for fixing the fourth reel 54.

When the flexible display device 100 is displayed on a large screen, a driving force of the sliding assembly 20 causes the flexible assembly 30 to move away from the second section 32, the third reel 53 and the fourth reel are subjected to a force applied by the flexible assembly 30 toward the elastic assembly 40. In order to reduce a force of contact areas of the flexible assembly 30 and the third reel 53 and the fourth reel 54, the first sliding shaft 531 and the third reel 53 and the second sliding shaft 541 and the fourth reel 54 move toward the elastic assembly 40 to reduce the forces between the third reel 53 and the fourth reel 54 and the flexible assembly 30. The flexible assembly 30 rolls along the reel 50 and causes the elastic assembly 40 to be stretched, and the second section 32 of the flexible assembly 30 is moved from within the housing 10 to the surface of the sliding assembly 20, so that the first section 31 and the second section 32 are in the display states.

When the flexible display device 100 is displayed on a small screen, a tensile force of the elastic assembly 40 causes the flexible assembly 30 to roll along the reel 50, the first sliding shaft 531 and the second sliding shaft 541 move away from the elastic assembly 40, whereby the second section 32 of the flexible assembly 30 is received in the housing 10.

In this embodiment, the specific number of the reel 50 of the applications is not limited and can be four or more.

In order to further reduce the stress between the flexible assembly 30 and the reel 50, the present application sets the number of reel 50 correspondings to the flexible screen 301 to an even number.

The following description will be made with reference to the embodiments in FIGS. 4 to 6.

Please refer to FIG. 4, the flexible display device 100 includes a first reel 51 and a second reel 52.

The flexible screen 301 in the second section 32 is stretched to the second reel 52 through a first curling by the first reel 51 and is stretched to the elastic assembly 40 through a second curling by the second reel 52.

The flexible screen 301 in this embodiment corresponds to the first reel 51 and the second reel 52.

Please refer to FIG. 5, the flexible display device 100 includes a first reel 51, a second reel 52, and a third reel 53.

The flexible screen 301 in the second section 32 is stretched to the second reel 52 through a first curling by the first reel 51, and is stretched to the third reel 53 through a second curling by the second reel 52, and is terminated between the second reel 52 and the third reel 53.

The flexible screen 301 in this embodiment corresponds to the first reel 51 and the second reel 52.

Please refer to FIG. 6, the flexible display device 100 includes a first reel 51, a second reel 52, a third reel 53, and a fourth reel 54.

The flexible screen 301 in the second section 32 is stretched to the second reel 52 through a first curling by the first reel 51, and is stretched to the third reel 53 through a second curling by the second reel 52, and is terminated between the second reel 52 and the third reel 53.

The flexible screen 301 in this embodiment corresponds to the first reel 51 and the second reel 52.

Alternatively, the flexible screen 301 in the second section 32 is stretched to the second reel 52 through a first curling by the first reel 51, is stretched to the third reel 53 through a second curling by the second reel 52, and is stretched to an elastic assembly 40 through a third curling by the third reel 53, and is stretched to the elastic assembly 40 through a fourth curling by the fourth reel 54, and is terminated between the fourth reel 54 and the elastic assembly 40.

The flexible screen 301 in this embodiment corresponds to the first reel 51, the second reel 52, the third reel 53, and the fourth reel 54.

In this embodiment, a direction of a first force forced on the flexible screen 301 by the first reel 51 is opposite to a direction of a second force forced on the flexible screen 301 by the second reel 52. The interaction of the first force with the second force reduces the force experienced by the flexible screen 301.

A direction of a third force forced on the flexible screen 301 by the third reel 53 is opposite to a direction of a fourth force forced on the flexible screen 301 by the fourth reel 54. The interaction of the third force with the fourth force reduces the force experienced by the flexible screen 301.

Thus, when the flexible screen 301 corresponds to an even number of the reel 50, a force exerted on the flexible screen 301 by the reels 50 will be reduced.

In FIG. 4 to FIG. 6, when the flexible display device 100 is displayed on the small screen, and the elastic assembly 40 has a pre-tension that causes the flexible assembly 30 to abut the reel 50.

Please refer to FIG. 1, the flexible display device 100 further includes an engagement assembly 60. The engagement assembly 60 is arranged at an edge of the flexible display device 100 and is disposed adjacent to the first side.

Figure 7:
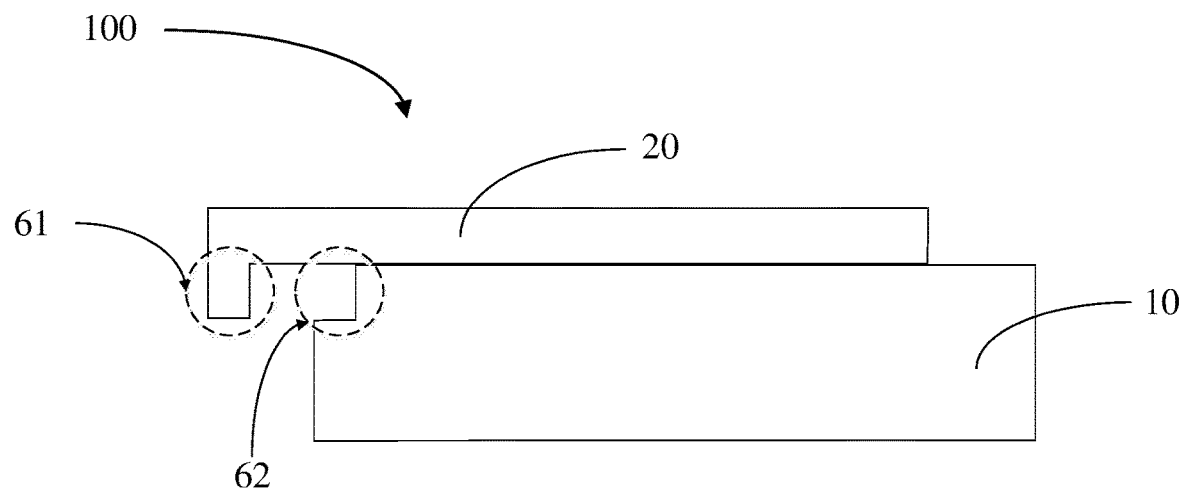
FIG. 7 is a first side view of a flexible display device of the present application.

Please refer to FIG. 7, FIG. 7 is a first side view of a flexible display device of the present application.

Figure 8:
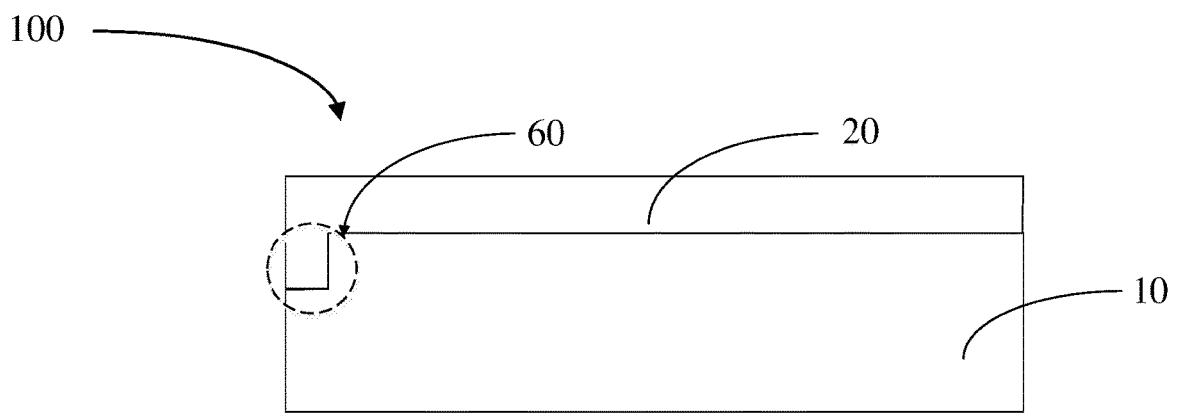
FIG. 8 is a second side view of a flexible display device of the present application.

Please refer to FIG. 8, FIG. 8 is a second side view of a flexible display device of the present application.

The engagement assembly 60 includes at least one protrusion 61 and at least one recession 62. One of the protrusions 61 corresponding to one of the recessions 62.

In this embodiment, a number of the protrusions 61 is equal to a number of the recessions 62.

In this embodiment, the protrusions 61 are disposed on an edge of the sliding assembly 20 and the recessions 62 are disposed on an edge of the housing 10.

When the flexible display device 100 is displayed on the large screen, an external driving force causes the protrusions 61 of the sliding assembly 20 to slide out from the recessions 62.

In this embodiment, a size of an area of the flexible display device 100 in the display state can be changed according to a space of the sliding assembly 20 away from the second side.

When the sliding assembly 20 moves to the occlusal area near the second side,

When an end of the sliding assembly 20 closed to the second side is moved to an engagement section, the area of the flexible display device 100 in the display state is the largest.

When the flexible display device 100 is displayed on the small screen, an external driving force moves the sliding assembly 20 toward the recessions 62, the protrusions 61 are engaged with the recessions 62, and the sliding assembly 20 is fixed to the housing 10.

Figure 9:
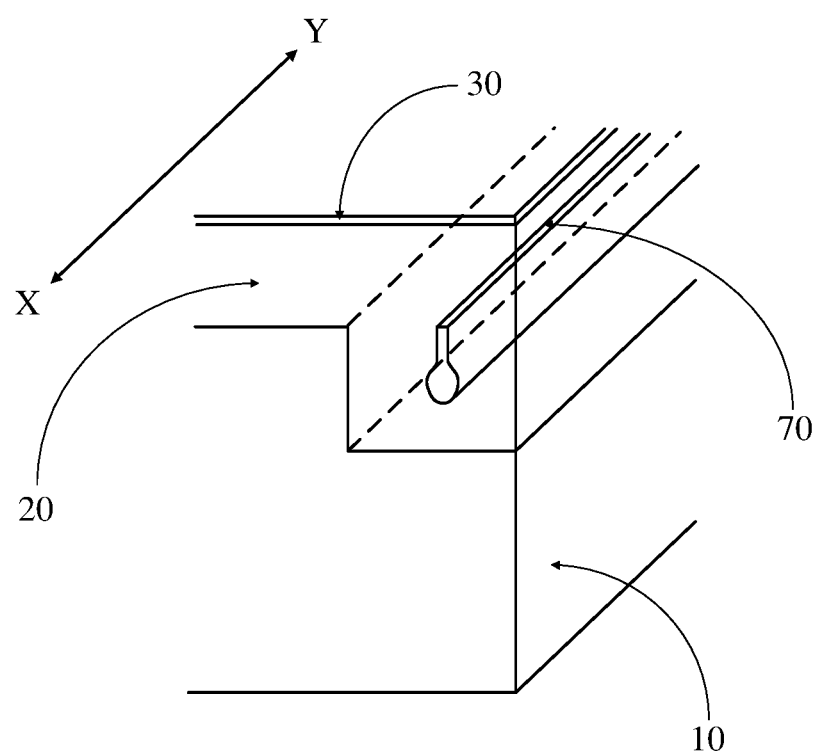
FIG. 9 is a third side view of a flexible display device of the present application.

Please refer to FIG. 9, FIG. 9 is a third side view of a flexible display device of the present application.

The engagement assembly 60 is disposed on both sides of a sliding direction of the flexible device 100.

The engagement assembly 60 further includes at least a slide rail 70, the sliding assembly 20 slides on the sliding rail 70 along the XY direction.

In this embodiment, the sliding direction is the XY direction.

In the flexible display device 100 of the present disclosure, further including a processor, a driving chip, and a power supply assembly disposed in the housing 10.

The present application proposes a flexible display device, including a housing, a sliding assembly positioned on the housing, and a flexible assembly positioned on the sliding assembly. The flexible assembly includes a first section and a second section positioned on the sliding assembly, and the second section is positioned in the housing. When the flexible display device is displayed on a small screen, the first section is in a display state, and the second section is in a non-display state. When the flexible display device is displayed on a large screen, the sliding assembly moves the second section from within the housing to a surface of the sliding assembly, and the first section and the second section are in the display states. By setting a part of the flexible screen within the housing, the present application can simultaneously realize a large screen or small screen display without occupying extra space.

Embodiments of the present invention have been described, but not intending to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A flexible display device, comprising:
    a housing, a sliding assembly positioned on the housing, and a flexible assembly positioned on the sliding assembly;
    wherein the flexible assembly comprises a first section positioned on the sliding assembly and a second section integrally connected to the first section, and the second section is positioned in the housing;
    when the flexible display device is structured and configured to be in a small screen display state and a large screen display state, wherein in the small screen display state, the first section is in a display state, and the second section is in a non-display state; and
    in the large screen display state, the sliding assembly is movable in a direction away from the second section, causing the second section to move from within the housing to a surface of the sliding assembly, wherein the first section and the second section are in displays;
    wherein the flexible assembly comprises a flexible screen, a stretched layer, and a bonding layer between the flexible screen and the stretched layer, and an area of the flexible screen is less than an area of the stretched layer.

2. The flexible display device according to claim 1, wherein the flexible assembly further comprises a third section connected to the second section, the flexible screen, the stretched layer, and the bonding layer between the flexible screen and the stretched layer are disposed in the first section and the second section, and the stretched layer is disposed in the third section.

3. The flexible display device according to claim 1, further comprising an elastic assembly disposed in the housing, wherein an end of the elastic assembly is fixed in the housing, and another end of the elastic assembly is elastically connected to the stretched layer of the flexible assembly.

4. The flexible display device according to claim 3, wherein the elastic assembly comprises a first fixing component, a second fixing component, and an elastic component, the first fixing component and the second fixing component are connected by the elastic component, and the first fixing component is fixed to the housing by welding or an adhesive, and the second fixing component is fixedly connected to the stretched layer by welding or an adhesive.

5. The flexible display device according to claim 4, wherein the elastic component is a spring.

6. The flexible display device according to claim 3, wherein the elastic assembly comprises a fixed shaft, a rotating shaft, and a curling member fixed to the rotating shaft, an end of the curling member is fixedly connected to the rotating shaft, and another end of the curling member is fixedly connected to the stretched layer in the third section.

7. The flexible display device according to claim 6, wherein material of the curling member is the same as material of the stretched layer.

8. The flexible display device according to claim 3, further comprising at least one reel disposed within the housing;
    wherein the flexible assembly is stretched into the housing by curling of the reel and is connected to the elastic assembly,
    when the flexible display device is displayed on the large screen, a driving force of the sliding assembly moves the flexible assembly in the direction away from the second section, and the sliding assembly drives the flexible assembly to roll along the reel to move the second section of the flexible assembly from within the housing to the surface of the sliding assembly, and when the flexible display device is displayed on the small screen, a tensile force of the elastic assembly causes the flexible assembly to roll along the reel, whereby the second section of the flexible assembly is received in the housing.

9. The flexible display device according to claim 8, further comprising a first reel disposed within the housing, wherein the housing further comprises a first side and a second side perpendicular to the flexible screen in the first section, the first side is opposite and parallel to the second side, the first side is disposed away from the second section, and the second side is disposed adjacent to the second section, and the first reel is disposed adjacent to the second side, and the flexible assembly is stretched in the housing through a first curling by the first reel and is connected to the elastic assembly.

10. The flexible display device according to claim 9, further comprising a second reel, wherein the second reel opposite to the first reel and is disposed adjacent to the first side; the flexible assembly is stretched to the second reel through the first curling by the first reel, and is stretched to the elastic assembly through a second curling by the second reel; and the elastic assembly is disposed between the first reel and the second reel.

11. The flexible display device according to claim 10, wherein a diameter of the second reel is less than a diameter of the first reel.

12. The flexible display device according to claim 10, further comprising a third reel disposed between the first reel and the second reel and closed to the first side, wherein the flexible assembly is stretched to the second reel through the first curling by the first reel, is stretched to the third reel through the second curling by the second reel, and is stretched to the elastic assembly through a third curling by the third reel, and the elastic assembly is disposed between the second reel and the third reel.

13. The flexible display device according to claim 12, wherein a diameter of the third reel is less than a diameter of the second reel.

14. The flexible display device according to claim 12, wherein the third reel is fixed on a sliding shaft, when the sliding assembly moves in the direction away from the second section, the third reel and the sliding shaft move toward the elastic assembly to move the second section from within the housing to the surface of the sliding assembly.

15. The flexible display device according to claim 1, further comprising an engagement assembly, wherein the engagement assembly is arranged at an edge of the flexible display device and is disposed adjacent to a first side of the housing.

16. The flexible display device according to claim 15, wherein the engagement assembly comprises at least one protrusion and at least one recession, and one of the protrusions corresponding to one of the recessions, the protrusions are disposed on the sliding assembly, the recessions are disposed on the housing, and the protrusions are engaged with the recessions.

17. The flexible display device according to claim 16, wherein a number of the protrusions is equal to a number of the recessions.

18. The flexible display device according to claim 15, wherein when the flexible display device is displayed on the large screen, an external driving force causes the protrusions of the sliding assembly to slide out from the recessions and the sliding assembly moves the second section from within the housing to the surface of the sliding assembly, and when the flexible display device is displayed on the small screen, the external driving force moves the sliding assembly toward the recessions, the protrusions are engaged with the recessions, and the sliding assembly is fixed to the housing.

19. The flexible display device according to claim 1, further comprising a processor, a driving chip, and a power supply assembly disposed in the housing.

* * * * *